MICROWAVE SWITCHES
Filed July 14, 1958

INVENTOR
Heinz H. Weichardt
BY
Pennie Edmonds Morton Barrows & Taylor
ATTORNEYS

United States Patent Office 2,935,584

Patented May 3, 1960

2,935,584

MICROWAVE SWITCHES

Heinz H. Weichardt, Dobbs Ferry, N.Y., assignor to Cutler-Hammer, Inc., Milwaukee, Wis., a corporation of Delaware Application July 14, 1958, Serial No. 748,467

11 Claims. (Cl. 200—87)

This invention relates to microwave switches.

Microwave switches are often required which alternately pass power and stop power. Such switches can be used singly for simply transmitting or cutting off power, or can be used in suitable combinations to switch power from one line to another.

In such switches it is usually important that the attenuation be very low in the pass power position so that the insertion losses can be kept small. On the other hand, it is often required that the attenuation be very high in the stop power position. For many applications fast switching action is important. In addition, it is highly desirable that the switch be capable of operation over a wire frequency band. Reliability is also important.

In addition to the foregoing, for many applications the switch must have small dimensions and require a minimum of driving power.

A primary object of the present invention is to provide a switch fulfilling the above requirements.

In accordance with the invention, a section of microwave transmission line is employed including inner and outer conductors. One section of the inner conductor, and advantageously at least two spaced sections, takes the form of a flat spring having its edges near the respectively adjacent walls of the outer conductor so that the field concentration at the edges of the spring is substantially greater than at the sides thereof in its pass power position. Then, in order to stop power transfer the springs are closed to contact a lateral wall so as to establish short circuits. The springs are long compared to the deflection thereof between pass and stop power positions, and are operated from one position to the other by another section of the inner conductor which produces a displacement in a direction generally lengthwise of the springs.

By the virtue of the field configuration employed, the position of the springs from the lateral wall or walls are non-critical in the pass power position thereof. Furthermore, only a slight displacement from the stop power position suffices to substantially remove the respective short circuits and allow power to pass through with very low attenuation. In addition, the mechanical amplification between the lengthwise displacement and the lateral deflection of the springs permits movement from pass to stop power positions, and vice versa, with only a slight displacement of the actuating section. Thus fast switching times with relatively small amounts of driving power are obtained.

The portions of the transmission line involved in the switching action are capable of operation over a very wide frequency band. In the specific embodiment described hereinafter the switch is provided with coaxial connectors to permit convenient insertion in a coaxial line. With proper design of the input and output transitions to the coaxial connectors, the switch can be used over a very wide frequency band.

When a pair of spaced spring sections is employed, a high attenuation in the stop power position can be obtained over a wide frequency band. However, for certain spacings of the short circuiting points in terms of wavelength, the attenuation is even higher than with other spacings. Accordingly, if it is required that a switch operate only over a relatively narrow frequency band, but have maximum attenuation over that band, the spacing can be selected accordingly, as described hereinafter.

The invention will be more fully understood by reference to the following description of a specific embodiment thereof, taken in conjunction with the drawings in which.

Figures 1, 2, 3, 4, 5, 6, 7:
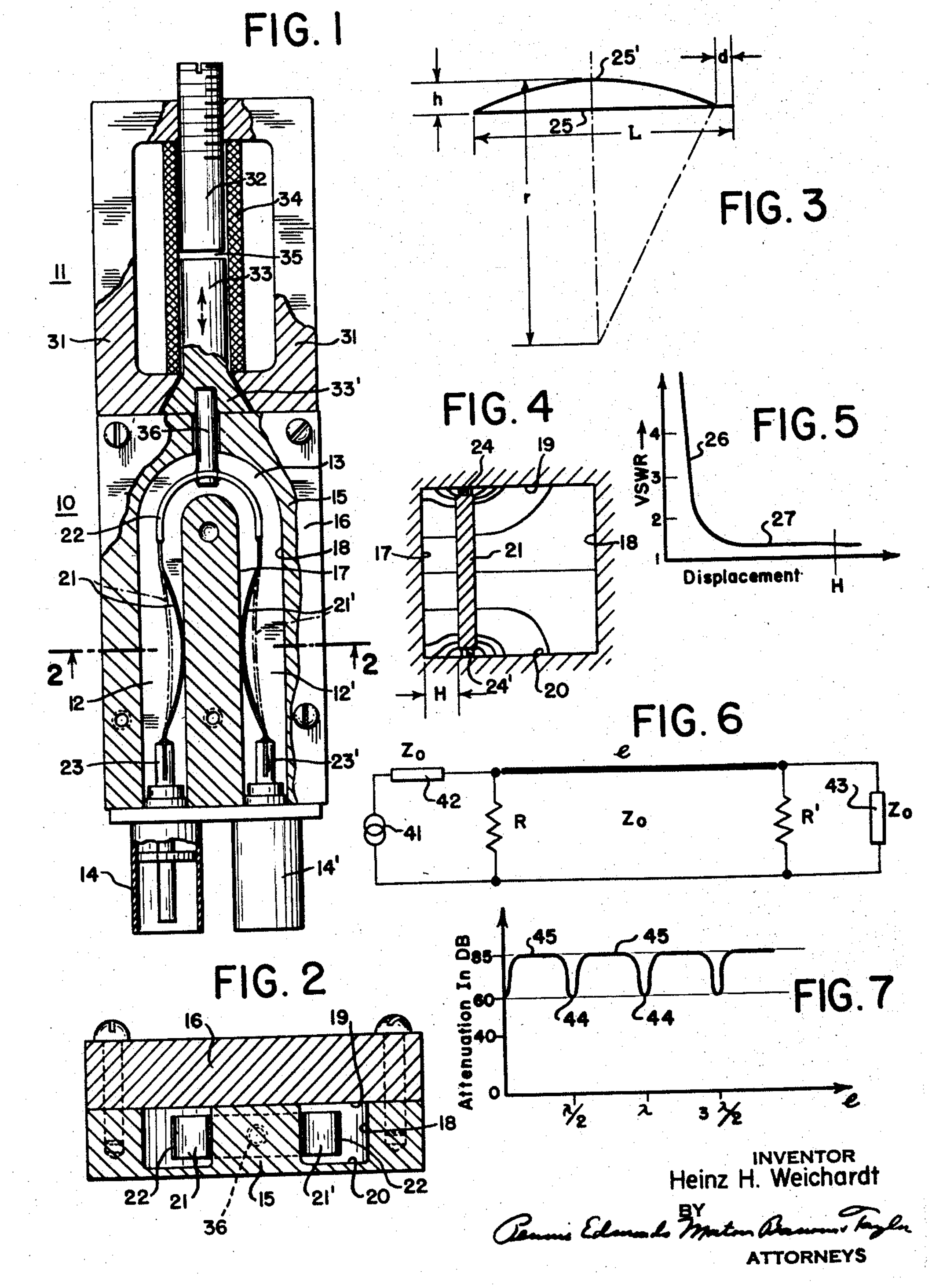
Fig. 1 is a plan view of a switch in accordance with the invention with portions of the top removed.
Fig. 2 is a cross-section taken along the line 2—2 of Fig. 1.
Fig. 3 shows the geometry relating deflection and displacement of a bent spring.
Fig. 4 shows the electric field lines associated with a spring section when in the pass power position.
Fig. 5 is a graph showing the relationship between the voltage standing wave ratio (VSWR) and deflection of a spring section.
Fig. 6 shows the equivalent electric circuit of the switch of Fig. 1.
Fig. 7 is a plot of attenuation versus electrical distance between short circuiting points.

Referring now to Fig. 1, the microwave switch portion is shown at one end 10 and a relay for actuating the switch at the other end 11. The switch portion includes a microwave transmission line arranged in a generally U-shape, with a pair of legs 12, 12', and an arcuate section 13 therebetween. The other ends of the legs are connected to coaxial connectors 14, 14'.

As specifically shown, the outer conductor of the transmission line is formed by a channel machined or otherwise formed in a metal block 15 and covered by a metal plate 16. For convenience of explanation, walls 17 and 18 of the channels will be termed the inner and outer walls, respectively, and walls 19 and 20 (Fig. 2) will be termed the top and bottom walls, respectively.

The inner conductor of the transmission line takes the form of a flat conductor having spring sections 21, 21' and a relatively rigid arcuate section 22. The term "flat" is employed as in conventional spring terminology to distinguish the cross-sectional shape, both springs and arcuate section being curved in the lateral direction.

The other ends of the springs are attached to the center pins 23, 23' of the coaxial connectors. The walls 17–20 of the channel are advantageously silver plated to form highly conductive surfaces at microwave frequencies. The springs 21, 21' may be made of any suitable material, beryllium-copper being found satisfactory for both springs and the arcuate section 22. These may be silver plated also, if desired.

The inner conductor has a flat cross-section arranged so that the edges thereof have only a small spacing from the top and bottom walls 19, 20 opposed thereto. In this manner the electric field concentration at the edges of the central conductor is substantially greater than at the sides thereof in the pass position of the switch.

Fig. 4 illustrates the configuration of electric field lines between the conter of one of the spring sections (at the line 2—2 of Fig. 1) when in its pass power position. It will be noted that the field concentration is much greater at the upper and lower edges 24, 24' than it is at the sides thereof. Because of this, the position of spring 21 between the inner and outer walls 17, 18 of the outer conductor is non-critical. The spring 21 can be moved considerably toward wall 18 or somewhat toward wall 17 without markedly changing the electric field configuration and therefore without markedly changing the line impedance.

Furthermore, since few field lines terminate on the outer wall 18 when the inner conductor is closer to the inner wall 17, in some cases the outer wall 18 could be removed and other means employed to avoid lateral radiation of energy.

The arcuate section 22 of the inner conductor is similarly arranged so that the field concentration at its edges is substantially greater than at its sides. As shown, it is more centrally positioned between the outer and inner walls 17, 18, but considerable latitude in the positioning is possible without substantially changing the line impedance.

A microwave transmission line having a cross-section such as shown in Fig. 4 has an impedance which is a function of the thickness of the central conductor and the spacing of the edges from the top and bottom walls. Fig. 4 shows the spring section 21 of the central conductor and this spring is ordinarily very thin compared to its width, so as not to require excessive displacement forces. The arcuate section 22 is advantageously considerably thicker so that it is relatively stiff. Consequently, the spacing between its edges and the top and bottom walls will commonly be somewhat greater than that of the springs. Thus with uniform spacing between top and bottom walls the arcuate section will be somewhat narrower than the springs. Where the springs join the arcuate section, a slight tapering in the width thereof is advantageously employed to avoid impedance mismatch.

Fig. 1 shows in full lines the short circuiting or stop power positions of springs 21, 21′. The dotted positions show the pass power positions thereof. In this embodiment the springs 21, 21′ are pre-set in a curved position so as to provide a very positive contact with inner wall 17 in the short circuit position. Since the springs are flat in cross-section, a considerable contact area is provided which further assures a low resistance short circuit. When the arcuate member is pulled outwards, the springs are stretched and assume the dotted positions shown. Due to the field configuration illustrated in Fig. 4, it is not necessary that the springs be fully straightened in their pass power position, since a uniform characteristic impedance, with low standing wave ratio and consequent low losses, is obtained even though the springs remain partially bent.

While it is preferred to initially pre-set the springs in their bent position, it is possible to pre-set them in their partially bent pass power position. Or, straight springs could be employed. In the latter case, however, stops should be provided so that the springs are slightly bent in their pass power position, so that there is no ambiguity as to which direction they will move when deflected to the stop power position.

Referring to Fig. 3, the geometry involved in bending and straightening a spring is shown. Here a spring of length L is displaced from the straight position 25 to the bent position 25′, or vice versa. In the bent position an arc of a circle of radius $r$ is assumed, which is sufficiently accurate for the purpose. If one end of the spring is displaced a distance $d$, the displacement $h$ of the center of the spring will be approximately as follows:

$$h=\frac{d}{2}\sqrt{\frac{2L}{d}-1} \text{ (approx.)} \qquad (1)$$

This equation is an approximation which is sufficiently accurate for the relatively small curvatures here involved. For a given displacement $d$, a much larger deflection $h$ is obtained. For example, for a spring one inch in length, a displacement $d$ of 0.02″ produces a deflection $h$ of 0.1″. These relationships exist in a switch which has been operated with success, and the mechanical amplification is five.

Referring to Fig. 5, a curve is shown relating to the VSWR and displacement of the centers of the springs from a short circuit or stop power position to an open circuit or pass power position. When the springs are in contact with the inner wall 17 of the outer conductor, a very high VSWR is obtained which is far above the range shown in Fig. 5. Consequently very high attenuation is present. As the springs are withdrawn from contact with the outer conductor, the VSWR drops rapidly along the region 26 of the curve until a region of very low VSWR is reached, as shown by portion 27 of the curve. At the displacement H shown in Fig. 4, the VSWR has reached the low value shown at H in Fig. 5. It will be observed that the VSWR reaches substantially its final low value at displacements much smaller than H.

Fig. 5 illustrates an important reason for the fast switching action obtained. Only very small movements of the springs, and consequently of the arcuate member 22, are required to change the switch from a pass power region with very low VSWR to a stop power region of very high attenuation, or vice versa.

In a specific embodiment of the invention which has been operated with success, the walls of the outer conductor formed a square which was 0.25″ on each side. Substantially the minimum VSWR was obtained when the springs have moved from contact with the inner wall 17 a distance of about 0.025″, the final displacement H being approximately 0.10″. A movement of the arcuate member 22 of only about 0.005″ sufficed to reach minimum VSWR, although the final movement corresponding to H was about 0.02″. Although not required to obtain the low VSWR, the larger displacement was found desirable in order to avoid undesirable signal modulations which might occur due to spring oscillations set up by impact of the relay armature against its stop.

The speed of the switching action will depend upon the speed with which the arcuate member 22 can be moved from one position to the other. Although any desired mechanism can be used for the purpose, a relay is employed in the embodiment of Fig. 1, and the construction shown has special advantages. Here, a substantially closed magnetic circuit comprises an outer core 31 with a central leg including a fixed member 32 and a movable armature 33. Actuating coil 34 surrounds the central leg.

In order to reduce leakage flux as much as possible, thereby promoting efficiency of operation, the air gap 35 between fixed member 32 and the armature 33 is located centrally of coil 34 so that substantially all the magnetic flux produced by the coil must pass through the air gap. Also to reduce leakage flux, the output end 33′ of the armature is conical and cooperates with a matching conical opening in the outer core 31. The output end of the armature is attached to the arcuate member 22 by a rod 36. A nylon rod has been found suitable for the purpose.

When the coil 34 is unenergized, the conical end 33′ of the armature abuts against the block 15 of the switch to provide a positive stop in this direction. The armature is urged to this position by the springs 21, 21′ which are preset during tempering to assume the position shown in full lines. When the coil 34 is energized, the armature moves outward to apply tension to the springs and draw them to the positions shown in dotted lines. A positive stop in this direction is provided by the conical end 33′ of the armature engaging the surrounding conical hole of core 31. Since a small air gap increases the force obtainable with a given coil and current, the fixed member 32 is threaded as shown so that the air gap can be initially adjusted.

The coil 34 may be energized in any desired manner. For fast switching, a pre-charged capacitor may be switched to discharge through coil 34. Or, the magnetic energy stored in an inductance may be discharged through the coil. Other expedients can be employed as meets the requirements of a particular application.

Fig. 6 illustrates an equivalent electrical circuit of the switch. Here an external generator is connected to a transmission line 42 having an impedance $Z_0$. Transmission line 42 includes any external line and the portion of the switch from the input connector 14 to the point of contact of spring 21 with the wall 17 of the outer conductor. At this point the resistance should be zero, but in practice an extremely small but finite resistance will still be present, as represented by R in Fig. 6. The portion of the switch between the short circuiting points is shown as a transmission line of length $l$ having an impedance $Z_0$ matching the external line impedance. The second short circuit by spring 21' likewise has an extremely small, but finite resistance, designated R'. The remainder of the switch to the output connector 14', and any connecting line, is shown at 43 and has a matching impedance $Z_0$. Upon analysis of the circuit it is found that the attenuation varies between maximum and minimum levels, depending upon the spacing of the short circuiting points in terms of wavelength.

Fig. 7 shows a plot of attenuation vs. number of wavelengths between the short circuiting points for a switch that has been operated with success. Minimum attenuation of 60 db was obtained at all frequencies over a very wide frequency band. The points of minimum attenuation are shown at 44 and correspond to odd multiples (including one) of half wavelengths. Calculations indicate that these minima are very sharp, agreeing with actual measurements.

In between these minima are broad maxima 45 shown at the 85 db line. From theoretical calculations, these maxima should extend to a considerable greater height, rather than flattening out. However, attenuations greater than 85 db at microwave frequencies are exceedingly difficult to measure, and are likely to be masked by R-F leakage outside the switch.

As shown in Fig. 7, if it is desired to obtain maximum attenuation, the spacing between short circuiting points should be selected to avoid odd multiples of half wavelengths for the frequency of operation. Maximum attenuation will be obtained when the spacing is an odd multiple of quarter wavelengths. However, very high attenuation over a considerable frequency band corresponding to spacings in the vicinity of an odd multiple of quarter wavelengths is possible, as indicated by the width of one of the maxima 45.

The transitions from the switch proper to the coaxial connectors 14, 14' are advantageously graduated to provide a smooth region of transition and thereby avoid impedance mismatch. In this manner operation over a very wide frequency band with low total insertion loss can be obtained.

Flat springs of rectangular cross-section have been shown herein, but it will be understood that some modifications of the cross-section are possible. For example, somewhat elliptical cross-sections may be employed. The shape should be such, however, that the field concentration at the upper and lower edges of the springs is substantially greater than the concentrations lateral thereof.

The power carrying capacity of the switch will eventually be limited by voltage breakdown between inner and outer conductors, particularly at the contact points therebetween. Higher power carrying capacity can be achieved by replacing the resistive short circuits with capacitive short circuits, for example, by lining the inner wall of the outer conductor with thin mica sheets at the short circuiting points. In such case lesser attenuations in the stop power position can be expected. Also, when the separation between short circuiting points is approximately an odd number of half wavelengths, very little attenuation will be obtained. However, for many applications such an arrangement may be useful.

The invention has been described in connection with a specific embodiment thereof. It will be understood that modifications may be made without departing from the spirit and scope of the invention.

I claim:

1. A microwave switch which comprises a microwave transmission line including inner and outer conductors, said inner conductor including at least one flat deformable section therein, said outer conductor having wall surfaces opposed to the edges of said flat deformable section and to at least one side thereof, the field concentration at the edges of said section being substantially greater than the concentration at the sides thereof, and means for deforming said section alternatively to substantially short-circuiting engagement with a wall of the outer conductor lateral of said section and to a substantially non-short circuiting position.

2. A microwave switch which comprises a microwave transmission line including inner and outer conductors, said inner conductor including at least one flat laterally-deformable section therein, said outer conductor having a wall surface opposed to one side of said section and a pair of wall surfaces opposed to respective edges of said flat section and in planes substantially parallel to the direction of lateral deformation thereof, the electric field concentration at the edges of said section being substantially greater than the concentration at the sides thereof when said section is in the pass power position, and means for laterally deforming said section alternatively into substantially short circuiting engagement with said outer conductor and to a non-short circuiting position substantially removed therefrom.

3. A microwave switch which comprises a microwave transmission line including inner and outer conductors, said inner conductor including at least one flat spring section therein, said outer conductor having a pair of substantially parallel wall surfaces opposed to respective edges of said spring section and at least one lateral wall surface substantially perpendicular to the parallel wall surfaces, the spacing between said edges and the respective parallel wall surfaces being small to provide an electric field concentration at the edges of said spring section substantially greater than the concentration at the sides thereof when the spring section is in the pass power position, and means for displacing one end of said spring section in a direction generally lengthwise thereof to deflect said spring section alternatively into and away from short circuiting engagement with said lateral wall surface of the outer conductor.

4. A microwave switch which comprises a microwave transmission line including inner and outer conductors, said inner conductor including at least one flat spring section and a relatively rigid section connecting therewith, said outer conductor having a pair of substantially parallel wall surfaces opposed to respective edges of said spring section and at least one lateral wall surface substantially perpendicular to the parallel wall surfaces, the spacing between said edges and the respective parallel wall surfaces being small to provide an electric field concentration at the edges of said spring section substantially greater than the concentration at the sides thereof when the spring section is in the pass power position, and means for displacing said rigid section to displace one end of said spring section in a direction generally lengthwise thereof to deflect said spring section alternatively into and away from short-circuiting engagement with said lateral wall surface of the outer conductor.

5. A microwave switch which comprises a microwave transmission line including inner and outer conductors and arranged in a generally U-shape with a pair of legs and an arcuate section therebetween, said inner conductor including a pair of flat deformable sections in respective legs and a relatively stiff arcuate section therebetween, said outer conductor having wall surfaces opposed to the edges of said flat deformable sections and to at least one side thereof respectively, the electric field concentrations at the edges of said flat sections being substantially greater than the concentrations at the sides thereof respectively, and means for displacing said arcuate section to bend said flat deformable sections into and away from substantially short-circuiting engagement with the wall of said outer conductor.

6. A microwave switch which comprises a microwave transmission line including inner and outer conductors and arranged in a generally U-shape with a pair of legs and an arcuate section therebetween, said inner conductor including a pair of flat laterally-deformable sections in respective legs and a relatively stiff arcuate section therebetween, said outer conductor having wall surfaces opposed to the edges of said flat deformable sections and to at least one side thereof respectively, the wall surfaces opposed to said edges being substantially parallel to the direction of deflection of said flat sections, the electric field concentrations at the edges of said flat sections being substantially greater than the concentrations at the sides thereof respectively when said connections are in the pass power position, and means for displacing said arcuate section to bend said flat deformable sections into and away from substantially short-circuiting engagement with the wall of said outer conductor.

7. A microwave switch which comprises a microwave transmission line including inner and outer conductors and arranged in a generally U-shape with a pair of legs and an arcuate section therebetween, said inner conductor including a pair of flat spring sections in respective legs and a relatively stiff arcuate section therebetween, said outer conductor having a pair of substantially parallel wall surfaces opposed to respective edges of said spring sections and at least one lateral wall surface substantially perpendicular to the parallel wall surfaces, said edges being close to said parallel wall surfaces respectively to provide an electric field concentration at said edges substantially greater than the concentration at the sides of the spring sections when in the pass power position, and means for displacing said arcuate section to displace respective ends of said spring sections generally lengthwise thereof to bend said spring sections alternatively into and away from substantially short-circuiting engagement with the respective lateral walls of the outer conductor.

8. A microwave switch which comprises a microwave transmission line including inner and outer conductors and arranged in a generally U-shape with a pair of legs and an arcuate section therebetween, said inner conductor including a pair of flat spring sections in respective legs and a relatively stiff flat arcuate section therebetween, said outer conductor having a pair of substantially parallel wall surfaces opposed to respective edges of said inner conductor and at least one lateral wall surface substantially perpendicular to the parallel wall surfaces, said edges being close to said parallel wall surfaces respectively to provide an electric field concentration at said edges substantially greater than the concentration at the sides of the inner conductor when in the pass power position, and means for displacing said arcuate section to displace respective ends of said spring sections generally lengthwise thereof to bend said spring sections alternatively into and away from substantially short-circuiting engagement with the respective lateral walls of the outer conductor.

9. A microwave switch which comprises a microwave transmission line including inner and outer conductors and arranged in a U-shape with substantially parallel legs and an arcuate section therebetween, said inner conductor including a pair of flat spring sections in respective legs and a relatively stiff flat arcuate section therebetween, said outer conductor having a pair of substantially parallel wall surfaces opposed to respective edges of said inner conductor and at least one lateral wall surface substantially perpendicular to the parallel wall surfaces, said edges being close to said parallel wall surfaces respectively to provide an electric field concentration at the sides of the inner conductor when in the pass power position, and means for displacing said arcuate section in a direction substantially parallel to said legs to displace the respective ends of said spring sections and bend said spring sections alternatively into and away from substantially short-circuiting engagement with a lateral wall surface of the outer conductor.

10. A microwave switch which comprises a microwave transmission line including inner and outer conductors and arranged in a U-shape with substantially parallel legs and an arcuate section therebetween, said inner conductor including a pair of flat spring sections in respective legs and a relatively stiff flat arcuate section therebetween, said outer conductor having a pair of substantially parallel wall surfaces opposed to respective edges of said inner conductor and at least one lateral wall surface substantially perpendicular to the parallel wall surfaces, said edges being close to said parallel wall surfaces respectively to provide an electric field concentration at said edges substantially greater than the concentration at the sides of the inner conductor when in the pass power position, said flat spring sections being pre-set in a curved condition whereby the centers thereof are normally urged into short-circuiting engagement with a lateral wall surface of the outer conductor, and means for displacing said arcuate section in a direction substantially parallel to said legs to apply tension to the respective ends of said spring sections and thereby break said short-circuiting engagements.

11. A microwave switch in accordance with claim 9 in which the spacing of the points of short-circuiting engagement is substantially different from an odd multiple of half wavelengths at the operating frequency of the switch.

References Cited in the file of this patent

UNITED STATES PATENTS

| | | |
|---|---|---|
| 1,501,019 | Lippincott | July 8, 1924 |
| 2,425,010 | Smith | Aug. 5, 1947 |
| 2,432,230 | Dorne | Dec. 9, 1947 |